United States Patent
Kahen et al.

(10) Patent No.: US 7,262,758 B2
(45) Date of Patent: Aug. 28, 2007

(54) DISPLAY DEVICE USING VERTICAL CAVITY LASER ARRAYS

(75) Inventors: Keith B. Kahen, Rochester, NY (US); Erica N. Montbach, Pittsford, NY (US)

(73) Assignee: Eastman Kodak Company, Rochester, NY (US)

(*) Notice: Subject to any disclaimer, the term of this patent is extended or adjusted under 35 U.S.C. 154(b) by 632 days.

(21) Appl. No.: 10/864,100

(22) Filed: Jun. 9, 2004

(65) Prior Publication Data
US 2005/0275615 A1    Dec. 15, 2005

(51) Int. Cl.
*G09G 3/36* (2006.01)

(52) U.S. Cl. .......... 345/102; 345/46; 372/39; 372/96

(58) Field of Classification Search .......... 345/46, 345/47, 102; 372/39, 69, 72, 96
See application file for complete search history.

(56) References Cited

U.S. PATENT DOCUMENTS

| | | | |
|---|---|---|---|
| 6,263,002 B1 * | 7/2001 | Hsu et al. ............ | 372/6 |
| 6,690,697 B1 | 2/2004 | Kahen | |
| 6,813,305 B2 * | 11/2004 | Clayton et al. ...... | 372/96 |
| 6,947,459 B2 * | 9/2005 | Kurtz et al. ......... | 372/43.01 |
| 7,082,147 B2 * | 7/2006 | Spoonhower et al. | 372/50.1 |
| 2002/0145685 A1 | 10/2002 | Mueller-Mach et al. | |
| 2004/0190573 A1 * | 9/2004 | Kruschwitz et al. ...... | 372/39 |
| 2004/0190584 A1 * | 9/2004 | Spoonhower et al. ....... | 372/108 |
| 2005/0147135 A1 * | 7/2005 | Kurtz et al. ........... | 372/23 |

FOREIGN PATENT DOCUMENTS

| | | |
|---|---|---|
| EP | 0 272 760 | 6/1988 |
| EP | 1 298 737 | 4/2003 |
| EP | 1 411 607 | 4/2004 |

OTHER PUBLICATIONS

W.A. Crossland et al., "Photoluminescent LCDs (PL-LCDs) Using Phosphors", SID Digest 837, (1997).
"Video-speed electronic paper based on electrowetting" by Robert A. Hayes et al., Nature, MacMillan Journals Ltd. London, GB, vol. 425, No. 6956, Sep. 25, 2003 pp. 383-385.
"Quantum Confined Atoms of Doped ZnO Nanocrystals" by R. N. Bhargave et al., Physica Status Solidi B Wiley-VCH Germany, vol. 229, No. 3, Feb. 2002 (pp. 897-901).

* cited by examiner

*Primary Examiner*—Richard Hjerpe
*Assistant Examiner*—Kimnhung Nguyen
(74) *Attorney, Agent, or Firm*—Raymond L. Owens

(57) ABSTRACT

A display apparatus for producing colored pixelated light includes a backlight unit for providing a pump-beam light. The apparatus also includes a microcavity light-producing array responsive to pump-beam light and having pixels wherein each pixel including a transparent substrate, a bottom dielectric stack reflective to light over a predetermined range of wavelengths, an active region responsive to pump-beam light for producing display light, and a top dielectric stack spaced from the bottom dielectric stack and reflective to light over a predetermined range of wavelengths. The apparatus further includes a light shutter for permitting selected display light from the microcavity light-producing array to pass therethrough, a polarizing layer disposed between the microcavity light-producing array and the light shutter, and a beam expander disposed over the light shutter for increasing the angular cone of view of the display light.

32 Claims, 10 Drawing Sheets

DISPLAY DEVICE USING VERTICAL CAVITY LASER ARRAYS

CROSS REFERENCE TO RELATED APPLICATIONS

Reference is made to commonly assigned U.S. patent application Ser. No. 10/857,508 filed May 28, 2004 by Keith B. Kahen, et al., entitled "Display Device Using Vertical Cavity Laser Arrays", and commonly assigned U.S. patent application Ser. No. 10/857,512 filed May 28, 2004 by Keith B. Kahen, et al., entitled "Vertical Cavity Laser Producing Different Color Light", the disclosures of which are herein incorporated by reference.

FIELD OF THE INVENTION

The present invention relates to a display device for producing colored light which uses a microcavity device array.

BACKGROUND OF THE INVENTION

In order to facilitate reading of the specification, the following terms are defined. Optic axis herein refers to the direction in which propagating light does not see birefringence. Polarizer and analyzer herein refer to elements that polarize electromagnetic waves. However, the one closer to the source of the light will be called a polarizer while the one closer to the viewer will be called an analyzer. Polarizing elements herein refers to both the polarizer and analyzer. Azimuthal angle $\phi$ and tilt angle $\theta$ are herein used to specify the direction of an optic axis. For the transmission axes of the polarizer and the analyzer, only the azimuthal angle $\phi$ is used, as their tilt angle $\theta$ is zero.

FIG. 1 shows the definition of the azimuthal angle $\phi$ and tilt angle $\theta$ to specify the direction of the optic axis 1 with respect to the x-y-z coordinate system 3. The x-y plane is parallel to the display surface 5, and the z-axis is parallel to the display normal direction 7. The azimuthal angle $\phi$ is the angle between the y-axis and the projection of the optic axis 9 onto the x-y plane. The tilt angle $\theta$ is the angle between the optic axis 1 and the x-y plane.

There are a number of ways of producing pixelated colored light for display applications, such as for example, using a conventional passive or active matrix organic light emitting diode (OLED) device. Another way is to employ a liquid crystal display (LCD). In typical LCD systems, a liquid crystal cell is placed between a pair of polarizers. Light that enters the display is polarized by the initial polarizer. As the light passes through the liquid crystal cell, the molecular orientation of the liquid crystal material affects the polarized light such that it either passes through the analyzer or it is blocked by the analyzer. The orientation of the liquid crystal molecules can be altered by applying a voltage across the cell, thus enabling varying amounts of light intensity to pass through the LCD pixels. By employing this principle, minimal energy is required to switch the LCD. This switching energy is typically much less than that required for cathode ray tubes (CRT) employing cathodoluminescent materials, making a display that utilizes liquid crystal materials very attractive.

The typical liquid crystal cell contains a color filter array (CFA) comprised of red, green, and blue transmitting pixels. To transmit a large portion of the light from the backlight unit (BLU), the transmission spectra of each of the CFA pixels must have a large full-width at half maximum (FWHM). As a result of the large FWHM, the color gamut of the LCD is, at best, approximately 0.7 of the NTSC color gamut standard. Additionally, as light impinges on the CFA, more then two-thirds of that light is absorbed by the CFA, permitting for less than one-third to be transmitted. Correspondingly, this absorption of light outside of each pixel's transmission spectra results in a loss of overall display efficiency.

A transmissive LCD is illuminated by a backlight unit, including a light source, light guide plate (LGP), reflector, diffuser, collimating films, and a reflective polarizer. The reflective polarizer is used to recycle and reflect light of the undesired polarization. However, not all of the light of the undesired polarization is recycled and not all of the recycled light exits the BLU with the correct polarization state. Therefore, only a small portion of light reflected from the reflective polarizer is recycled into the correct polarization state. As a result, an unpolarized BLU light source results in nearly a factor of two efficiency loss upon passing through the bottom polarizer.

LCDs are quickly replacing CRTs and other types of electronic displays for computer monitors, televisions, and other office and household displays. However, LCD's suffer from poor contrast ratios at larger viewing angles. Unless the contrast ratio is improved at large viewing angles, the penetration of LCDs into certain markets will be limited. The poor contrast ratio is typically due to increased brightness of the display's dark state. LCDs are optimized such that the display has the highest contrast ratio within a narrow viewing cone centered on axis (at zero degrees viewing angle). As the display is viewed off-axis at larger viewing angles, the dark state experiences an increase in brightness, thus decreasing the contrast ratio. When viewing full color displays off axis, not only does the dark state increase in brightness, but also there is a shift in color of both the dark and bright states. In the past there has been an attempt to improve this hue shift and loss of contrast ratio by various methods, such as the introduction of compensation films into the display or segmenting the pixel even further using multi-domains. However, these methods improve the hue shift and contrast ratio only slightly and for a limited viewing cone. Also, the manufacturing of compensation films and multi-domain liquid crystal cells is typically expensive, thus increasing the overall cost of the display.

Other flat panel displays try to solve the viewing angle problem by incorporating a photoluminescent (PL) screen on the front of the LCD, which is called a PL-LCD, as described in W. Crossland, SID Digest 837, (1997). This display employs a backlight unit of narrow band frequency, a liquid crystal modulator, and a photoluminescent output screen for producing color. The PL-LCD light source utilizes wavelengths that are in the UV, which would accelerate the breakdown of the liquid crystal materials. Also, the PL-LCD light source is much less efficient than the standard cold cathode fluorescent lamps (CCFLs) used in typical LCD displays.

In general, it would be beneficial to produce a display that did not suffer from the problems associated with typical LCD displays. As discussed above, these drawbacks are loss of efficiency (due to unpolarized backlights and usage of CFA's), poor color gamut, and loss of contrast and color at larger viewing angles. OLED displays overcome some of these disadvantages, however, they currently suffer from short lifetimes and higher manufacturing costs. Part of the higher manufacturing cost is inherent in the OLED design, such as the need to pixelate the OLED emitter region and the greater complexity of thin film transistors (TFTs) for current driven devices.

SUMMARY OF THE INVENTION

It is therefore an object of the present invention to provide a display that overcomes the disadvantages inherent in typical LCD displays, such as loss of efficiency, poorer color gamut, and lower contrast and color at larger viewing angles.

This object is achieved by a display apparatus for producing colored pixelated light, comprising:
a) a backlight unit for providing a pump-beam light;
b) a microcavity light-producing array responsive to pump-beam light and having pixels wherein each pixel includes:
   i) a transparent substrate;
   ii) a bottom dielectric stack reflective to light over a predetermined range of wavelengths;
   iii) an active region responsive to pump-beam light for producing display light;
   iv) a top dielectric stack spaced from the bottom dielectric stack and reflective to light over a predetermined range of wavelengths;
c) a light shutter for permitting selected display light from the microcavity light-producing array to pass therethrough;
d) a polarizing layer disposed between the microcavity light-producing array and the light shutter; and
e) a beam expander disposed over the light shutter for increasing the angular cone of view of the display light.

ADVANTAGES

It is an advantage of the present invention to use a pixelated two-dimensional microcavity device array as the light source for a liquid crystal display. Microcavity devices have the useful feature that through proper engineering of the device design it is possible to reduce the divergence angle of the outputted light to less than 10-15°. This small divergence angle enables a 1:1 correspondence between the microcavity's color elements and the liquid crystal display's color elements. Correspondingly, it is no longer necessary to include the color filter array as one of the LCD film components.

Since the microcavity light passes through the LC switches nearly on axis, the problems associated with contrast and color shifts for large viewing angles are limited. An additional feature of the near collimation of the light source is that the liquid crystal viewing angle compensation films can be removed from the display structure. It is also common to include collimating films as part of the LCD components; however, these films can be removed since the microcavity device output from the two-dimensional array is naturally collimated (<10-15° divergence angle).

Additional advantages of the present invention come from the light output from each color element being spectrally narrow. This property results in a large enhancement of the color gamut of the liquid crystal display. In applications that prefer a limited viewing angle, such as for privacy viewing, the near collimation of the light source results in a much enhanced on-axis viewing brightness for the display compared to typical ones. This enhancement can either permit greatly increased display brightnesses or can be traded for greatly increased display power efficiency (enabling a large boost in the battery lifetime).

DETAILED DESCRIPTION OF THE INVENTION

Figure 1:
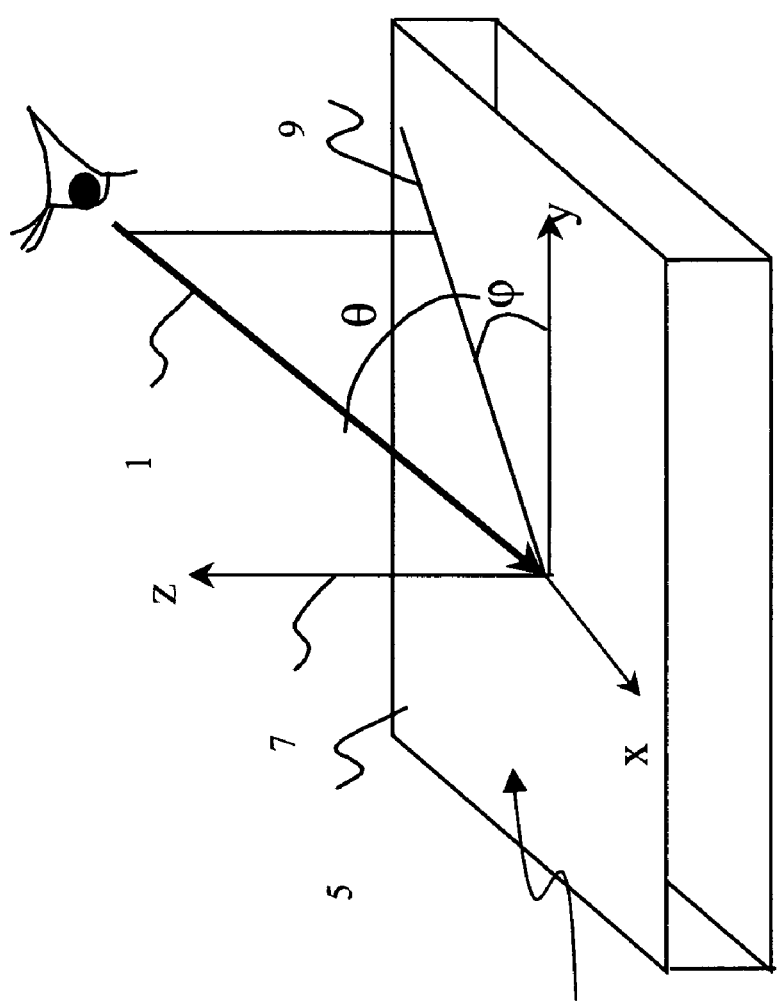
FIG. 1 shows a perspective which is useful in understanding the definition of the tilt and azimuthal angles to specify a direction of an optic axis.
Figure 2:
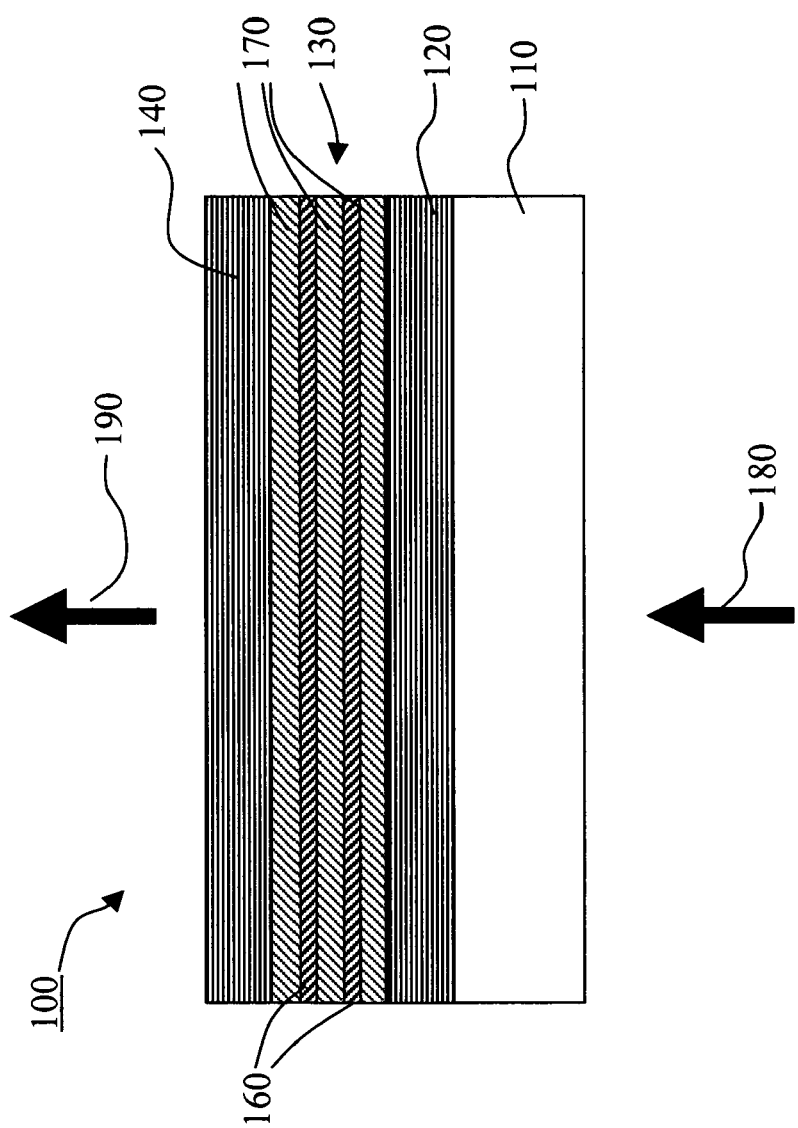
FIG. 2 shows a side cross sectional schematic of an optically pumped two-dimensional microcavity device array light source.
Figure 3:
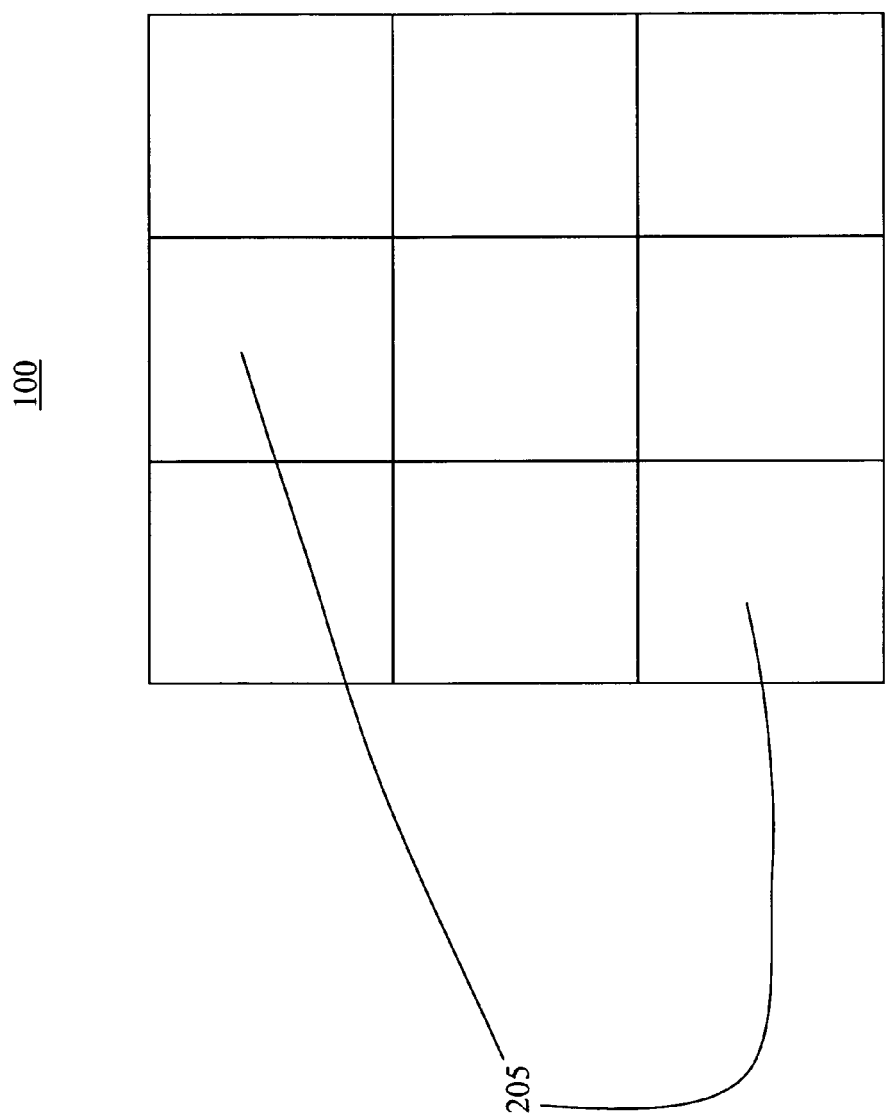
FIG. 3 shows a top view of a two-dimensional microcavity device array light source containing red, green, and blue emitting elements.

The invention is enabled by a light source that is both nearly collimated and spectrally narrow. In addition, the light source must contain red, green, and blue emitting elements from a common substrate whose size is on the scale of 80×240 μm. A light source that meets these criteria is a two-dimensional microcavity array device 100, as shown schematically in FIG. 2. FIG. 3 shows a top view of the microcavity array device 100 where on the surface of the microcavity device needs to be defined red, green, and blue (RGB) emitting elements 205. In order to produce red, green, and blue microcavity light from a common substrate, the active region 130 can be composed of organic-based gain media. In addition, recent research, R. N. Bhargava, Phys. Stat. Sol. 229, 897 (2002), points to the possibility of obtaining visible wavelength emission from inorganic-based nanoparticles. One possibility is ZnO nanoparticles (with preferred diameters less than 10 nm) either undoped or doped with impurities, such as, $Mn^{2+}$ or $Eu^{2+}$. As a further example, colloidal CdSe/CdS heterostructure quantum dots have demonstrated quantum yields above 80%, A. P. Alivisatos, MRS Bulletin 18 (1998).

Referring back to FIG. 2, the substrate 110 should be light transmissive. As a result, the substrate 110 can be transparent glass or plastic. On the substrate 110 is deposited the bottom dielectric stack 120, which is composed of alternating high and low refractive index dielectric materials. In general, the bottom dielectric stack 120 is designed to be reflective to microcavity light over a predetermined range of wavelengths. Typical high and low refractive index materials are $TiO_2$ and $SiO_2$, respectively. The bottom dielectric stack 120 can be deposited by plasma-enhanced chemical vapor deposition, electron-beam (e-beam) deposition, or sputtering. Additional methodologies are polymeric extrusion, and sol-gel and colloidal depositions, as commonly practiced in the art.

The active region 130 is deposited over the bottom dielectric stack 120. FIG. 2 shows that the active region 130 is not a bulk layer but a multilayer composite. The active region 130 contains one or more periodic gain regions 160, which are separated by spacer layers 170. The thickness of the periodic gain regions 160 is typically less than 50 nm, with a preferred thickness of 5 to 30 nm. The thicknesses of the spacer layers 170 are chosen such that the periodic gain region(s) is aligned with the antinodes of the microcavity's standing electromagnetic field (e-field). Employing periodic gain region(s) 160 in the active region 130 results in larger power conversion efficiencies and a large reduction in the unwanted spontaneous emission. In summary, the active region 130 includes one or more periodic gain regions 160 and spacer layers 170 disposed on either side of the periodic gain region(s) and arranged so that the periodic gain region(s) is aligned with the antinodes of the device's standing wave electromagnetic field.

The periodic gain region(s) 160 is composed of either small-molecular weight organic material, polymeric organic material, or inorganic-based nanoparticles, which fluoresce with a high quantum efficiency. The small-molecular weight organic material is typically deposited by high-vacuum ($10^{-6}$ Torr) thermal evaporation, while the conjugated polymers and inorganic nanoparticles are usually formed by spin casting.

Unless otherwise specifically stated, use of the term "substituted" or "substituent" means any group or atom other than hydrogen. Additionally, when the term "group" is used, it is meant that when a substituent group contains a substitutable hydrogen, it is also intended to encompass not only the substituent's unsubstituted form, but also its form further substituted with any substituent group or groups as herein mentioned, so long as the substituent does not destroy properties necessary for device utility. Suitably, a substituent group can be halogen or can be bonded to the remainder of the molecule by an atom of carbon, silicon, oxygen, nitrogen, phosphorous, sulfur, selenium, or boron. The substituent can be, for example, halogen, such as chloro, bromo or fluoro; nitro; hydroxyl; cyano; carboxyl; or groups which can be further substituted, such as alkyl, including straight or branched chain or cyclic alkyl, such as methyl, trifluoromethyl, ethyl, t-butyl, 3-(2,4-di-t-pentylphenoxy)propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2, 4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2, 4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonyl amino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecyl-phenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl, N-[3-(dodecyloxy)propyl]-sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy) acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxy-sulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1(N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which can be substituted and which contain a 3 to 7 membered heterocyclic ring composed of carbon atoms and at least one hetero atom selected from the group including oxygen, nitrogen, sulfur, phosphorous, or boron. such as 2-furyl, 2-thienyl, 2-benzimidazolyloxy or 2-benzothiazolyl; quaternary ammonium, such as triethylammonium; quaternary phosphonium, such as triphenylphosphonium; and silyloxy, such as trimethylsilyloxy.

If desired, the substituents can themselves be further substituted one or more times with the described substituent groups. The particular substituents used can be selected by those skilled in the art to attain the desired properties for a specific application and can include, for example, electron-withdrawing groups, electron-donating groups, and steric groups. When a molecule can have two or more substituents, the substituents can be joined together to form a ring such as a fused ring unless otherwise provided. Generally, the above groups and substituents thereof can include those having up to 48 carbon atoms, typically 1 to 36 carbon atoms and usually less than 24 carbon atoms, but greater numbers are possible depending on the particular substituents selected.

Substitution can include fused ring derivatives such as but not limited to benzo-, dibenzo-, naphtha-, or dinaphtho-fused derivatives. These fused ring derivatives can be further substituted as well.

The organic-based periodic gain region(s) 160 (or emissive material) can be comprised of a single host material, but more commonly includes a host material doped with a guest compound (dopant) or compounds where light emission comes primarily from the dopant and can be of any color. These host-dopant combinations are advantageous since they result in very small unpumped scattering/absorption losses for organic-based gain media (can be less than 1 cm$^{-1}$). The dopant is usually chosen from highly fluorescent dyes, but phosphorescent compounds, e.g., transition metal complexes as described for OLED applications in WO 98/55561, WO 00/18851, WO 00/57676, and WO 00/70655 are also useful. Dopants are typically coated as 0.01 to 10% by weight into the host material, wherein they can be selected to provide emitted light having hues of either red, green, or blue. An example of a useful host-dopant combination for red emitting layers is Alq as the host material and 1% L39 [4-(dicyanomethylene)-2-t-butyl-6-(1,1,7,7-tetramethyljulolidyl-9-enyl)-4H-pyran] as the dopant.

An important relationship for choosing a dye as a dopant is a comparison of the absorption of the dopant material and emission of the host material. For efficient energy transfer (via Forster energy transfer) from the host to the dopant molecule, a necessary condition is that the absorption of the dopant overlaps the emission of the host material. Those skilled in the art are familiar with the concept of Forster energy transfer, which involves a radiationless transfer of energy between the host and dopant molecules. An important relationship for choosing the host material is that the absorption of the host material significantly overlaps the emission spectrum of the pump-beam 180 light. In addition, it is preferred that the absorption of the host material or a host material plus a dopant is small at the microcavity emission wavelength of the microcavity array device 100. An acceptable level of absorption is that the absorption coefficient of the host plus dopant combination is less than 1000 cm$^{-1}$ at the wavelength of the microcavity emission.

Useful fluorescent emissive materials includes polycyclic aromatic compounds as described in I. B. Berlman, "Handbook of Fluorescence Spectra of Aromatic Molecules," Academic Press, New York, 1971 and EP 1 009 041. Tertiary aromatic amines with more than two amine groups can be used including oligomeric materials.

Another class of useful emissive materials (for host or dopants) include aromatic tertiary amines, where the latter is understood to be a compound containing at least one trivalent nitrogen atom that is bonded only to carbon atoms, at least one of which is a member of an aromatic ring. In one form the aromatic tertiary amine can be an arylamine, such as a monoarylamine, diarylamine, triarylamine, or an oligomeric arylamine. Exemplary monomeric triarylamines are illustrated by Klupfel, et al. U.S. Pat. No. 3,180,730. Other suitable triarylamines substituted with one or more vinyl radicals and/or comprising at least one active hydrogen containing group are disclosed by Brantley, et al. U.S. Pat. Nos. 3,567,450 and 3,658,520.

A more preferred class of aromatic tertiary amines are those which include at least two aromatic tertiary amine moieties as described in U.S. Pat. Nos. 4,720,432 and 5,061,569. Such compounds include those represented by structural Formula A

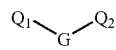

wherein:

$Q_1$ and $Q_2$ are independently selected aromatic tertiary amine moieties; and G is a linking group such as an arylene, cycloalkylene, or alkylene group of a carbon to carbon bond.

In one embodiment, at least one of $Q_1$ or $Q_2$ contains a polycyclic fused ring structure, e.g., a naphthalene. When G is an aryl group, it is conveniently a phenylene, biphenylene, or naphthalene moiety.

A useful class of triarylamines satisfying structural Formula A and containing two triarylamine moieties is represented by structural Formula B

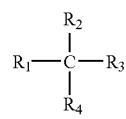

where:

$R_1$ and $R_2$ each independently represent a hydrogen atom, an aryl group, or an alkyl group or $R_1$ and $R_2$ together represent the atoms completing a cycloalkyl group; and $R_3$ and $R_4$ each independently represent an aryl group, which is in turn substituted with a diaryl substituted amino group, as indicated by structural Formula C

wherein $R_5$ and $R_6$ are independently selected aryl groups. In one embodiment, at least one of $R_5$ or $R_6$ contains a polycyclic fused ring structure, e.g., a naphthalene.

The host material can comprise a substituted or unsubstituted triarylamine compound. Another class of aromatic tertiary amines are the tetraaryldiamines. Desirable tetraaryldiamines include two diarylamino groups, such as indicated by Formula C, linked through an arylene group. Useful tetraaryldiamines include those represented by Formula D

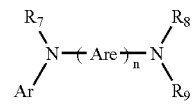

wherein:

each Are is an independently selected arylene group, such as a phenylene or anthracene moiety;

n is an integer of from 1 to 4; and

Ar, $R_7$, $R_8$, and $R_9$ are independently selected aryl groups.

In a typical embodiment, at least one of Ar, $R_7$, $R_8$, and $R_9$ is a polycyclic fused ring structure, e.g., a naphthalene.

The various alkyl, alkylene, aryl, and arylene moieties of the foregoing structural Formulae A, B, C, D, can each in turn be substituted. Typical substituents include alkyl groups, alkoxy groups, aryl groups, aryloxy groups, and halogens such as fluoride, chloride, and bromide. The various alkyl and alkylene moieties typically contain from 1 to about 6 carbon atoms. The cycloalkyl moieties can contain from 3 to about 10 carbon atoms, but typically contain five, six, or seven carbon atoms, e.g. cyclopentyl, cyclohexyl, and cycloheptyl ring structures. The aryl and arylene moieties are usually phenyl and phenylene moieties.

The emissive material can be formed of a single or a mixture of aromatic tertiary amine compounds. Specifically, one can employ a triarylamine, such as a triarylamine satisfying the Formula B, in combination with a tetraaryldiamine, such as indicated by Formula D. The host material can include a substituted or unsubstituted dicarbazole-biphenyl compound. Illustrative of useful aromatic tertiary amines is the following:

4,4'-N,N'-dicarbazole-1,1'-biphenyl (CBP) (D1);
4,4'-Bis[N-(1-naphthyl)-N-phenylamino]biphenyl (D2);
4,4'-Bis[N-(1-naphthyl)-N-(2-naphthyl)amino]biphenyl (D3);
4,4'-Bis[N-(2-naphthyl)-N-p-tolylamino]biphenyl (D4);
1,1-Bis(4-di-p-tolylaminophenyl)cyclohexane;
1,1-Bis(4-di-p-tolylaminophenyl)-4-phenylcyclohexane;
4,4'-Bis(diphenylamino)quadriphenyl;
Bis(4-dimethylamino-2-methylphenyl)-phenylmethane;
N,N,N-Tri(p-tolyl)amine;
4-(di-p-tolylamino)-4'-[4(di-p-tolylamino)-styryl]stilbene;
N,N,N',N'-Tetra-p-tolyl-4-4'-diaminobiphenyl;
N,N,N',N'-Tetraphenyl-4,4'-diaminobiphenyl;
N,N,N',N'-tetra-1-naphthyl-4,4'-diaminobiphenyl;
N,N,N',N'-tetra-2-naphthyl-4,4'-diaminobiphenyl;
N-Phenylcarbazole;
4,4"-Bis[N-(1-naphthyl)-N-phenylamino]p-terphenyl;
4,4'-Bis[N-(2-naphthyl)-N-phenylamino]biphenyl;
4,4'-Bis[N-(3-acenaphthenyl)-N-phenylamino]biphenyl;
1,5-Bis[N-(1-naphthyl)-N-phenylamino]naphthalene;
4,4'-Bis[N-(9-anthryl)-N-phenylamino]biphenyl;
4,4"-Bis[N-(1-anthryl)-N-phenylamino]-p-terphenyl;
4,4'-Bis[N-(2-phenanthryl)-N-phenylamino]biphenyl;
4,4'-Bis[N-(8-fluoranthenyl)-N-phenylamino]biphenyl;
4,4'-Bis[N-(2-pyrenyl)-N-phenylamino]biphenyl;
4,4'-Bis[N-(2-naphthacenyl)-N-phenylamino]biphenyl;
4,4'-Bis[N-(2-perylenyl)-N-phenylamino]biphenyl;
4,4'-Bis[N-(1-coronenyl)-N-phenylamino]biphenyl;
2,6-Bis(di-p-tolylamino)naphthalene;
2,6-Bis[di-(1-naphthyl)amino]naphthalene;
2,6-Bis[N-(1-naphthyl)-N-(2-naphthyl)amino]naphthalene;
N,N,N',N'-Tetra(2-naphthyl)-4,4"-diamino-p-terphenyl;
4,4'-Bis{N-phenyl-N-[4-(1-naphthyl)-phenyl]amino}biphenyl;
4,4'-Bis[N-phenyl-N-(2-pyrenyl)amino]biphenyl;
2,6-Bis[N,N-di(2-naphthyl)amine]fluorene;
1,5-Bis[N-(1-naphthyl)-N-phenylamino]naphthalene; and
4,4',4"-tris[(3-methylphenyl)phenylamino]triphenylamine.

The host material can comprise a substituted or unsubstituted aza-aromatic compound. For example, the host material can comprise a substituted or unsubstituted acridine, quinoline, purine, phenazine, phenoxazine, or phenanthroline compound. Carbazole derivatives are useful hosts. Useful examples of phenanthroline materials include 2,9-dimethyl-4,7-diphenyl-1,10-phenanthroline and 4,7-diphenyl-1,10-phenanthroline.

Host and dopant molecules include, but are not limited to, those disclosed in U.S. Pat. Nos. 4,768,292; 5,141,671; 5,150,006; 5,151,629; 5,405,709; 5,484,922; 5,593,788; 5,645,948; 5,683,823; 5,755,999; 5,928,802; 5,935,720; 5,935,721; and 6,020,078.

Metal complexes of 8-hydroxyquinoline and similar derivatives (Formula E) constitute one class of useful host materials capable of supporting electroluminescence, and are particularly suitable for light emission of wavelengths longer than 500 nm, e.g., green, yellow, orange, and red.

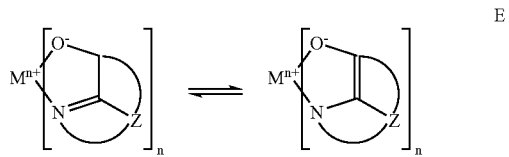

E wherein:
M represents a metal;
n is an integer of from 1 to 3; and
Z independently in each occurrence represents the atoms completing a nucleus having at least two fused aromatic rings.

From the foregoing it is apparent that the metal can be monovalent, divalent, trivalent, or tetravalent metal. The metal can, for example, be an alkali metal, such as lithium, sodium, or potassium; an alkaline earth metal, such as magnesium or calcium; an earth metal, such aluminum or gallium, or a transition metal such as zinc or zirconium. Generally any monovalent, divalent, trivalent, or tetravalent metal known to be a useful chelating metal can be employed.

Z completes a heterocyclic nucleus containing at least two fused aromatic rings, at least one of which is an azole or azine ring. Additional rings, including both aliphatic and aromatic rings, can be fused with the two required rings, if required. To avoid adding molecular bulk without improving on function the number of ring atoms is usually maintained at 18 or less.

The host material can comprise a substituted or unsubstituted chelated oxinoid compound.

Illustrative of useful chelated oxinoid compounds are the following:
CO-1: Aluminum trisoxine[alias, tris(8-quinolinolato)aluminum(III)];
CO-2: Magnesium bisoxine[alias, bis(8-quinolinolato)magnesium(II)];
CO-3: Bis[benzo {f}-8-quinolinolato]zinc (II);
CO-4: Bis(2-methyl-8-quinolinolato)aluminum(III)-μ-oxo-bis(2-methyl-8-quinolinolato) aluminum(III);
CO-5: Indium trisoxine[alias, tris(8-quinolinolato)indium];
CO-6: Aluminum tris(5-methyloxine)[alias, tris(5-methyl-8-quinolinolato) aluminum(III)];
CO-7: Lithium oxine[alias, (8-quinolinolato)lithium(I)];
CO-8: Gallium oxine[alias, tris(8-quinolinolato)gallium (III)]; and
CO-9: Zirconium oxine[alias, tetra(8-quinolinolato)zirconium(IV)].

The host material can include a substituted or unsubstituted anthracene compound.

Derivatives of 9,10-di-(2-naphthyl)anthracene (Formula F) constitute one class of useful hosts capable of supporting photoluminescence, and are particularly suitable for light emission of wavelengths longer than 400 nm, e.g. blue, green, yellow, orange or red.

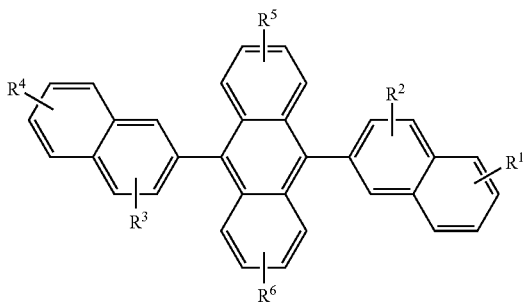

F wherein $R^1$, $R^2$, $R^3$, $R^4$, $R^5$, and $R^6$ represent one or more substituents on each ring where each substituent is individually selected from the following groups:

Group 1: hydrogen, or alkyl of from 1 to 24 carbon atoms;
Group 2: aryl or substituted aryl of from 5 to 20 carbon atoms;
Group 3: carbon atoms from 4 to 24 necessary to complete a fused aromatic ring of anthracenyl, pyrenyl, or perylenyl;
Group 4: heteroaryl or substituted heteroaryl of from 5 to 24 carbon atoms as necessary to complete a fused heteroaromatic ring of furyl, thienyl, pyridyl, quinolinyl or other heterocyclic systems;
Group 5: alkoxylamino, alkylamino, or arylamino of from 1 to 24 carbon atoms; and
Group 6: fluorine, chlorine, bromine or cyano.

Illustrative examples include 9,10-di-(2-naphthyl)anthracene (F1) and 2-t-butyl-9,10-di-(2-naphthyl)anthracene (F2). Other anthracene derivatives can be useful as a host, including derivatives of 9,10-bis-(4-(2,2'-diphenylethenyl)phenyl)anthracene.

Benzazole derivatives (Formula G) constitute another class of useful hosts capable of supporting photoluminescence, and are particularly suitable for light emission of wavelengths longer than 400 nm, e.g., blue, green, yellow, orange or red.

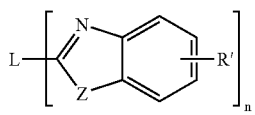

G where:
n is an integer of 3 to 8;
Z is O, NR or S; and
R and R' are individually hydrogen; alkyl of from 1 to 24 carbon atoms, for example, propyl, t-butyl, heptyl, and the like; aryl or hetero-atom substituted aryl of from 5 to 20 carbon atoms for example phenyl and naphthyl, furyl, thienyl, pyridyl, quinolinyl and other heterocyclic systems; or halo such as chloro, fluoro; or atoms necessary to complete a fused aromatic ring; and L is a linkage unit including alkyl, aryl, substituted alkyl, or substituted aryl, which conjugately or unconjugately connects the multiple benzazoles together. An example of a useful benzazole is 2,2',2"-(1,3,5-phenylene)tris[1-phenyl-1H-benzimidazole].

The host material can comprise a substituted or unsubstituted benzoxazole compound, a substituted or unsubstituted benzthiazole compound, or a substituted or unsubstituted benzimidazole compound. The host material can comprise a substituted or unsubstituted oxazole compound, a substituted or unsubstituted triazole compound, or a substituted or unsubstituted oxadiazole compound. Useful examples of oxazole compounds include 1,4-bis(5-phenyloxazol-2-yl)benzene, 1,4-bis(4-methyl-5-phenyloxazol-2-yl)benzene, and 1,4-bis(5-(p-biphenyl)oxazol-2-yl)benzene. Useful examples of oxadiazole compounds include 2-(4-biphenylyl)-5-phenyl-1,3,4-oxadiazole and 2-(4-biphenylyl)-5-(4-tert-butylphenyl)-1,3,4-oxadiazole. Useful examples of triazole compounds include 3-(4-biphenylyl)-4-phenyl-5-tert-butylphenyl-1,2,4-triazole.

Distyrylarylene derivatives are also useful as host materials or dopant materials. Many examples are described in U.S. Pat. No. 5,121,029. Useful emissive materials (hosts and dopants) can have the general Formulae (H) or (I):

$$X\text{---}CH\text{=}CH\text{---}Y\text{---}CH\text{=}CH\text{-}Z \quad (H)$$

$$X\text{---}(CH\text{=}CH)_n\text{---}Z \quad (I)$$

where:
X and Z are independently a substituted or unsubstituted aromatic group or a substituted or unsubstituted aromatic complex ring group having one nitrogen atom;
n equals 1, 2, or 3; and
Y is a divalent aromatic group or a divalent aromatic complex ring group having one nitrogen atom. Useful examples include 1,4-bis(2-methylstyryl)-benzene, 4,4'-(9,10-anthracenediyldi-2,1-ethenediyl)bis(N,N-bis(4-methylphenyl)-benzenamine, 4,4'-(1,4-naphthalene-diyldi-2,1-ethenediyl)bis(N,N-bis(4-methylphenyl) benzenamine, and 4,4'-(1,4-phenylenedi-2,1-ethenediyl)bis(N,N-(4-tolyl))benzeneamine.

The organic-based dopant is selected to provide emission between 300-1700 nm. The dopant can be selected from fluorescent or phosphorescent dyes. Useful fluorescent dopants include materials as described as host materials above. Other useful fluorescent dopants include, but are not limited to, derivatives of substituted or unsubstituted anthracene, tetracene, xanthene, perylene, rubrene, coumarin, rhodamine, and quinacridone, dicyanomethylenepyran compounds, thiopyran compounds, polymethine compounds, pyrilium and thiapyrilium compounds, fluorene derivatives, periflanthene derivatives, indenoperylene derivatives, bis(azinyl)amine boron compounds, bis(azinyl) methane compounds, napthyridine, fluoranthene, furan, indole, thiaphene, benzoxanthene, pyrene, peropyrene, terphenyl, quaterphenyl, quinquephenyl, sexiphenyl, anthanthrene, bisanthrene compounds, N,N,N',N'-tetrasubstituted benzidene derivatives, N,N,N',N'-tetrarylbenzidene derivatives and carbostyryl compounds or combinations thereof. Derivatives of these classes of materials can also serve as useful host materials or combinations thereof. Host materials will often be compounds containing at least three phenylene moieties.

Illustrative examples of useful dopants include, but are not limited to, the following:

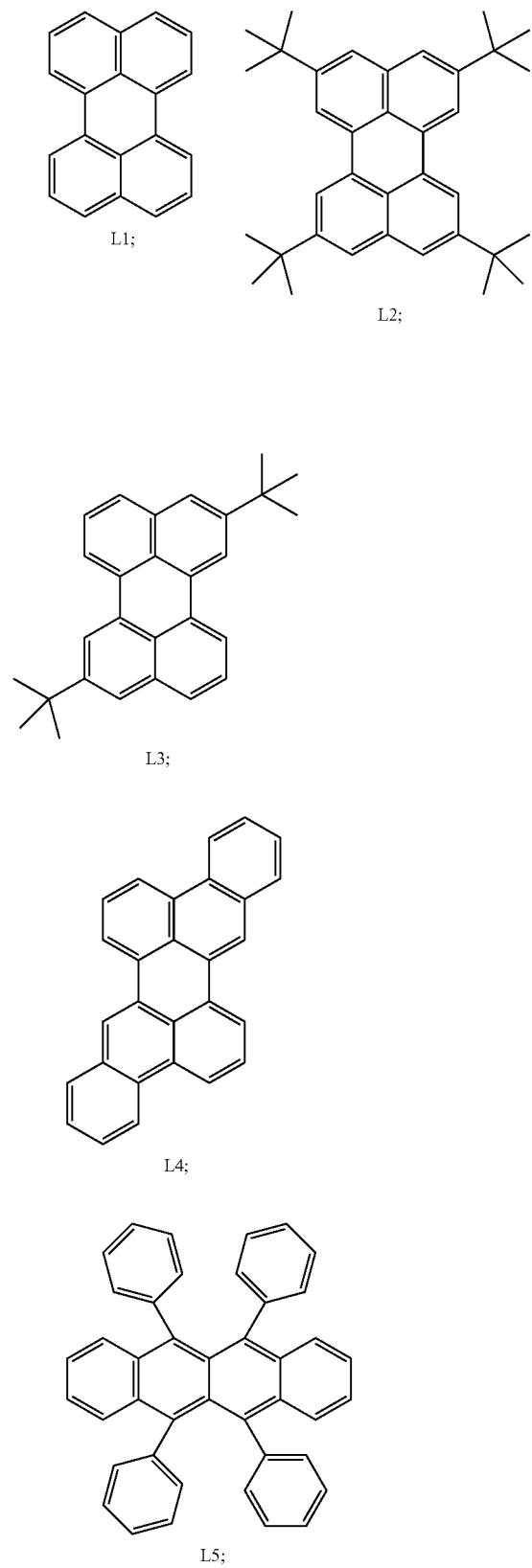
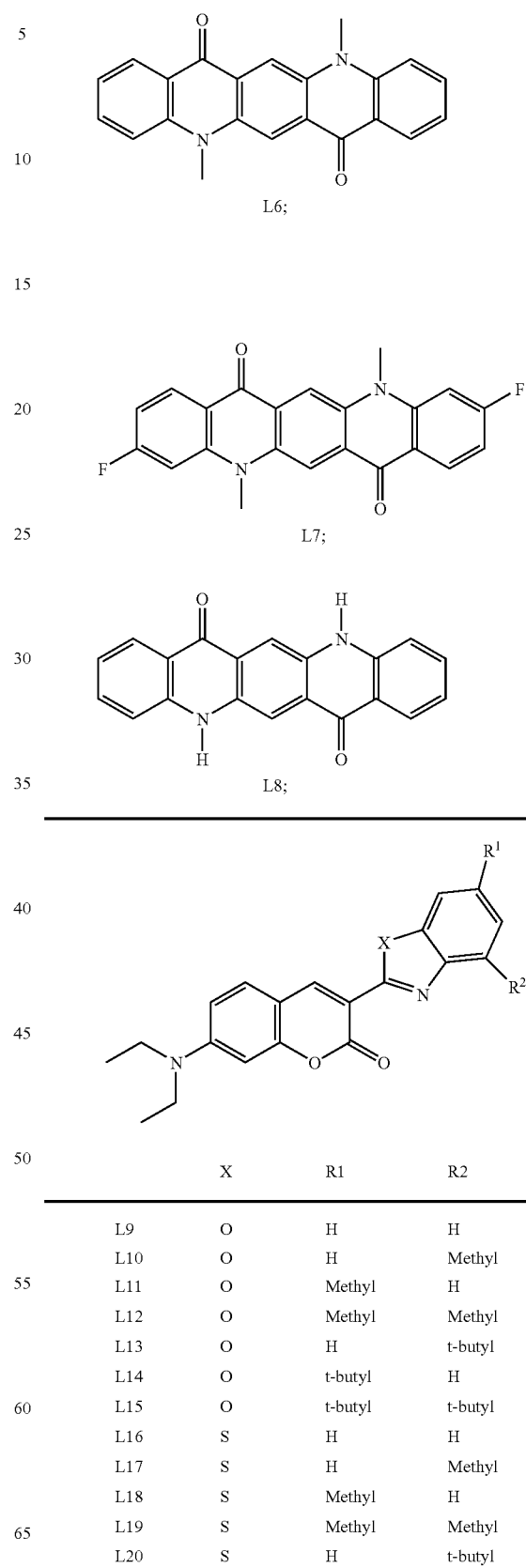
| | X | R1 | R2 |
|---|---|---|---|
| L9 | O | H | H |
| L10 | O | H | Methyl |
| L11 | O | Methyl | H |
| L12 | O | Methyl | Methyl |
| L13 | O | H | t-butyl |
| L14 | O | t-butyl | H |
| L15 | O | t-butyl | t-butyl |
| L16 | S | H | H |
| L17 | S | H | Methyl |
| L18 | S | Methyl | H |
| L19 | S | Methyl | Methyl |
| L20 | S | H | t-butyl |

-continued
| | | | |
|---|---|---|---|
| L21 | S | t-butyl | H |
| L22 | S | t-butyl | t-butyl; |
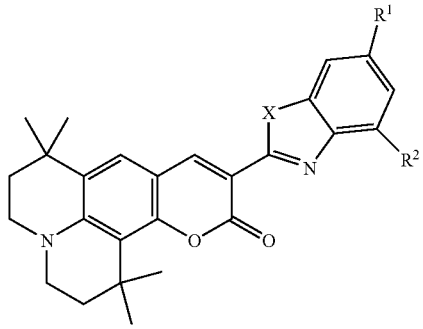
| | X | R1 | R2 |
|---|---|---|---|
| L23 | O | H | H |
| L24 | O | H | Methyl |
| L25 | O | Methyl | H |
| L26 | O | Methyl | Methyl |
| L27 | O | H | t-butyl |
| L28 | O | t-butyl | H |
| L29 | O | t-butyl | t-butyl |
| L30 | S | H | H |
| L31 | S | H | Methyl |
| L32 | S | Methyl | H |
| L33 | S | Methyl | Methyl |
| L34 | S | H | t-butyl |
| L35 | S | t-butyl | H |
| L36 | S | t-butyl | t-butyl; |
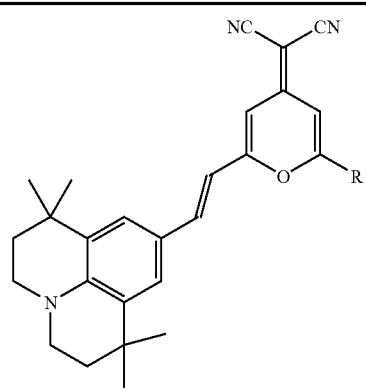
| | R |
|---|---|
| L37 | phenyl |
| L38 | methyl |
| L39 | t-butyl |
| L40 | mesityl; |
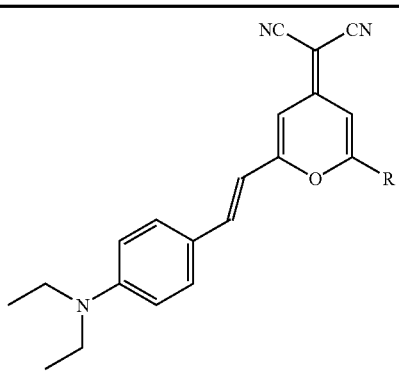
-continued
| | R |
|---|---|
| L41 | phenyl |
| L42 | methyl |
| L43 | t-butyl |
| L44 | mesityl; |
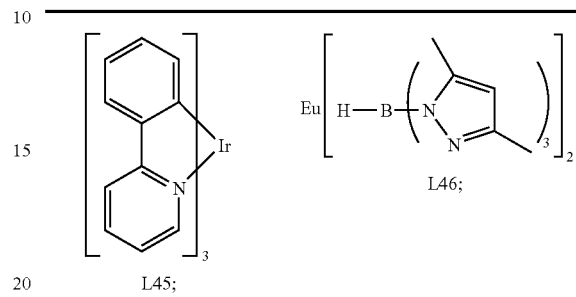
L45;    L46;
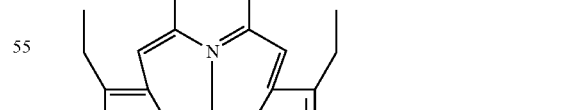
L47;
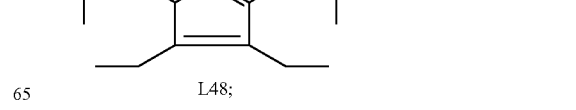
L48;

-continued
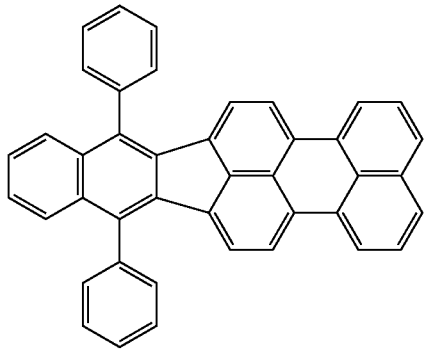
L49;
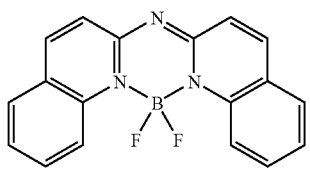
L50;
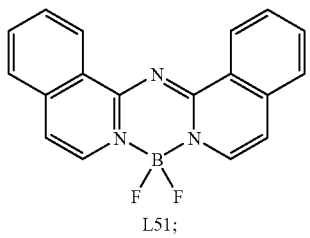
L51;
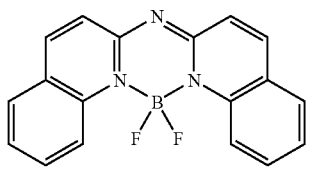
L52;
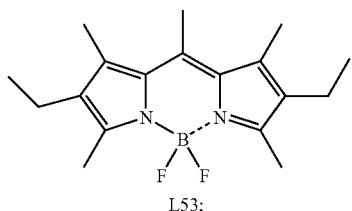
L53;
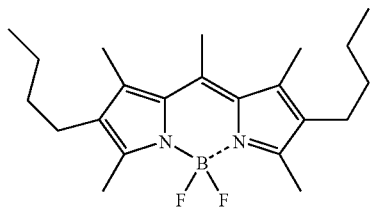
L54;
-continued
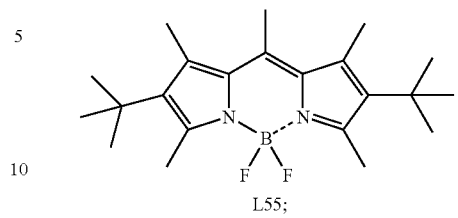
L55;
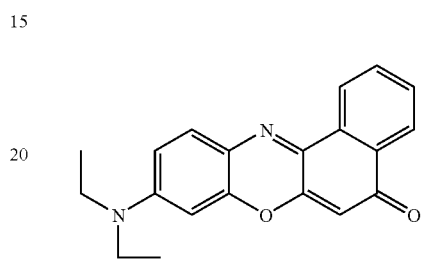
L56;
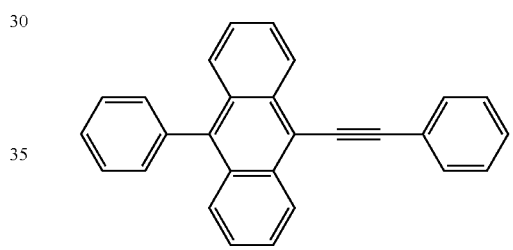
L57;
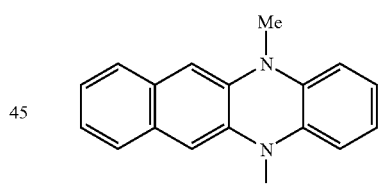
L58;
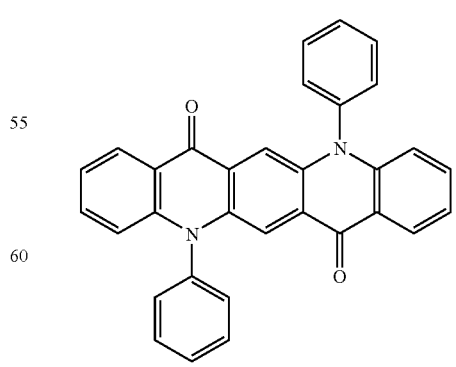
L59;

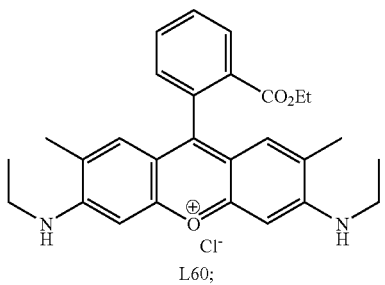

L60;

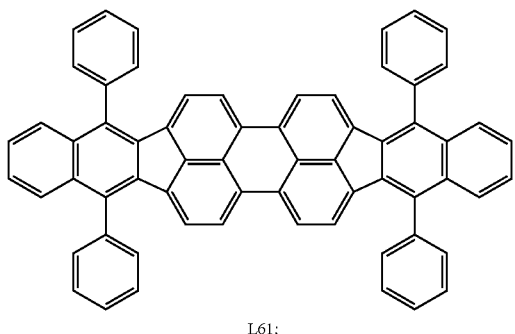

L61;

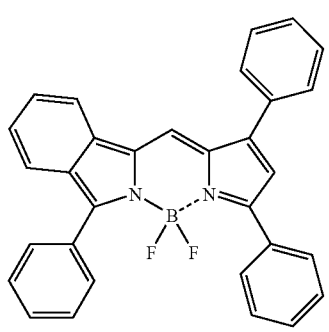

L62.

Other emissive materials include various heterocyclic optical brighteners as described in U.S. Pat. No. 4,539,507.

The emissive material can also be a polymeric material, a blend of two or more polymeric materials, or a doped polymer or polymer blend. The emissive material can also include more than one nonpolymeric and polymeric materials with or without dopants. Typical dopants are listed previously for nonpolymeric molecules. Nonpolymeric dopants can be molecularly dispersed into the polymeric host, or the dopant could be added by copolymerizing a minor constituent into the host polymer. Typical polymeric materials include, but are not limited to, substituted and unsubstituted poly(p-phenylenevinylene) (PPV) derivatives, substituted and unsubstituted poly(p-phenylene) (PPP) derivatives, substituted and unsubstituted polyfluorene (PF) derivatives, substituted and unsubstituted poly(p-pyridine), substituted and unsubstituted poly(p-pyridalvinylene) derivatives, and substituted, unsubstituted poly(p-phenylene) ladder and step-ladder polymers, and copolymers thereof as taught by Diaz-Garcia, et al. in U.S. Pat. No. 5,881,083 and references therein. The substituents include but are not limited to alkyls, cycloalkyls, alkenyls, aryls, heteroaryls, alkoxy, aryloxys, amino, nitro, thio, halo, hydroxy, and cyano. Typical polymers are poly(p-phenylene vinylene), dialkyl-, diaryl-, diamino-, or dialkoxy-substituted PPV, mono alkyl-mono alkoxy-substituted PPV, mono aryl-substituted PPV, 9,9'-dialkyl or diaryl-substituted PF, 9,9'-mono alky-mono aryl substituted PF, 9-mono alky or aryl substituted PF, PPP, dialkyl-, diamino-, diaryl-, or dialkoxy-substituted PPP, mono alkyl-, aryl-, alkoxy-, or amino-substituted PPP. In addition, polymeric materials can be used such as poly(N-vinylcarbazole) (PVK), polythiophenes, polypyrrole, polyaniline, and copolymers such as poly(3,4-ethylenedioxythiophene)/poly(4-styrenesulfonate) also called PEDOT/PSS.

The organic materials mentioned above are suitably deposited through sublimation, but can be deposited from a solvent with an optional binder to improve film formation. If the material is a polymer, solvent deposition is usually preferred. The material to be deposited by sublimation can be vaporized from a sublimator "boat" often comprised of a tantalum material, e.g. as described in U.S. Pat. No. 6,237,529, or can be first coated onto a donor sheet and then sublimed in closer proximity to the substrate. Layers with a mixture of materials can utilize separate sublimator boats or the materials can be pre-mixed and coated from a single boat or donor sheet.

As shown in FIG. 3 and discussed above, the microcavity device array contains red, green, and blue emitting pixels with dimensions on the order of 80×240 μm. The emission color is determined by the combination of the length of the emission path and the fluorescence spectrum of the gain media contained in the periodic gain region 160. Patterned deposition of the gain media contained in the periodic gain region 160 can be achieved using shadow masks, integral shadow masks (U.S. Pat. No. 5,294,870), spatially-defined thermal dye transfer from a donor sheet (U.S. Pat. Nos. 5,688,551; 5,851,709; and 6,066,357) and inkjet methods (U.S. Pat. No. 6,066,357). If the periodic gain region 160 is more than one layer, then the patterned deposition needs to be repeated accordingly.

Most organic-based microcavity devices are sensitive to moisture or oxygen, or both, so they are commonly sealed in an inert atmosphere such as nitrogen or argon. Desiccant such as alumina, bauxite, calcium sulfate, clays, silica gel, zeolites, alkaline metal oxides, alkaline earth metal oxides, sulfates, or metal halides and perchlorates can be incorporated into the sealed device. Methods for encapsulation and desiccation include, but are not limited to, those described in U.S. Pat. No. 6,226,890. In addition, barrier layers such as SiOx, Teflon, and alternating inorganic/polymeric layers are known in the art for encapsulation.

For the spacer layer 170 it is preferred to use a material that is highly transparent to both the microcavity emission 190 and the pump-beam 180. In this embodiment 1,1-Bis-(4-bis(4-methyl-phenyl)-amino-phenyl)-cyclohexane (TAPC) is chosen as the spacer material, since it has very low absorption throughout the visible and near UV spectrum and its index of refraction is slightly lower than that of most organic host materials. This refractive index difference is useful since it helps in maximizing the overlap between the standing e-field antinodes and the periodic gain region(s) 160. Besides organic spacer materials, the spacer layer 170 can also be composed of inorganic materials, such as $SiO_2$, since it has low absorption and its index of refraction is less than that of organic host materials. When using inorganic-based spacer layers, the materials can be deposited either by thermal evaporation, e-beam at low deposition temperatures (around 70° C.), or colloidal methods.

Following the growth of the active region 130 is the deposition of the top dielectric stack 140. The top dielectric stack 140 is spaced from the bottom dielectric stack 120 and reflective to light over a predetermined range of wavelengths. Its composition is analogous to that of the bottom dielectric stack. Since the top dielectric stack 140 is deposited over an active region 130 that contains organics (for the case of organic-based gain media), its deposition temperature must be kept low in order to avoid melting the organics and thermal expansion mismatches (between the organics and the inorganic dielectric stack material) which occur upon cooling the sample back down to room temperature. As a result, a typical deposition temperature for the top dielectric stack 140 is 100° C. or lower. The top dielectric stack can be deposited by conventional ways, such as e-beam, low-energy sputtering, or colloidal deposition. In order to obtain effective microcavity device performance, it is preferred that the peak reflectivity of the bottom dielectric stack 120 be greater than 99% while the peak reflectivity of the top dielectric stack 140 be less than 90%.

The microcavity array device 100 is optically driven by an incident pump-beam source 180 and emits microcavity emission 190. The pump-beam light 180 can be incoherent LED light. FIG. 2 shows microcavity emission 190 through the top dielectric stack 140. Alternatively, the microcavity structure could be optically pumped through the top dielectric stack 140 with the microcavity emission 190 through the substrate 110 by proper design of the dielectric stack reflectance properties. The operation of the microcavity array device 100 occurs by the following ways. The pump-beam 180 transmits through the substrate 110 and the bottom dielectric stack 120 and is absorbed by the periodic gain region(s) 160, wherein some fraction of the pump-beam energy is re-emitted as longer wavelength microcavity light. When the pump-beam 180 enters through the substrate 110, to ensure that the microcavity emission 190 mainly exits through the top dielectric stack 140, it is necessary to choose the top dielectric stack peak reflectance to be smaller than the bottom dielectric stack 120 peak reflectance. To improve the power conversion efficiency of the device, it is common practice to add additional dielectric layers to both dielectric stacks, such that, the top dielectric stack 140 is highly reflective to the pump-beam 180 and the bottom dielectric stack 120 is highly transmissive to the pump-beam 180.

Figure 4:
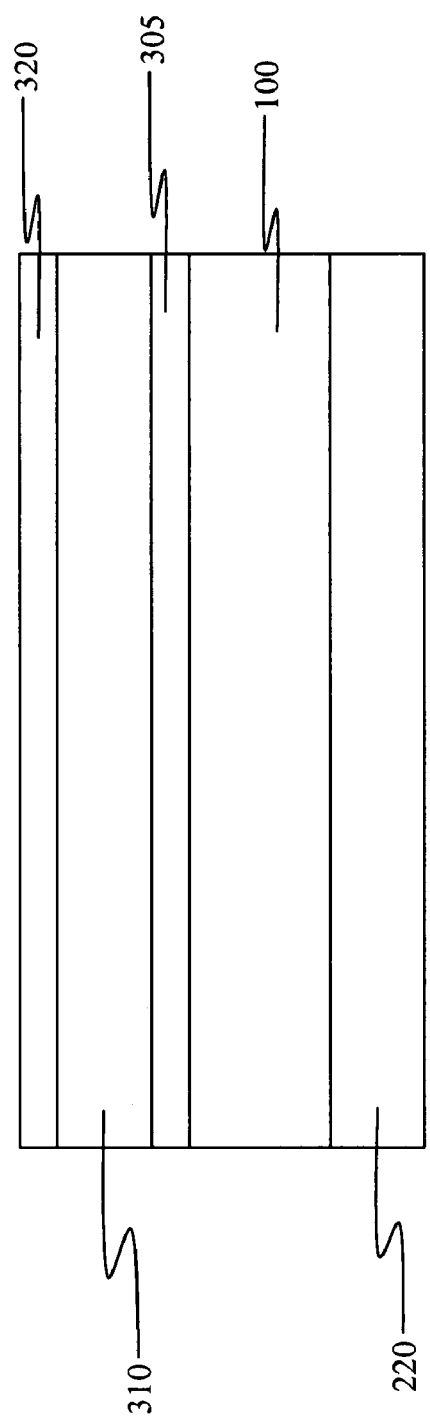
FIG. 4 is a simplified schematic of the display device containing the microcavity device array light source.
Figure 5:
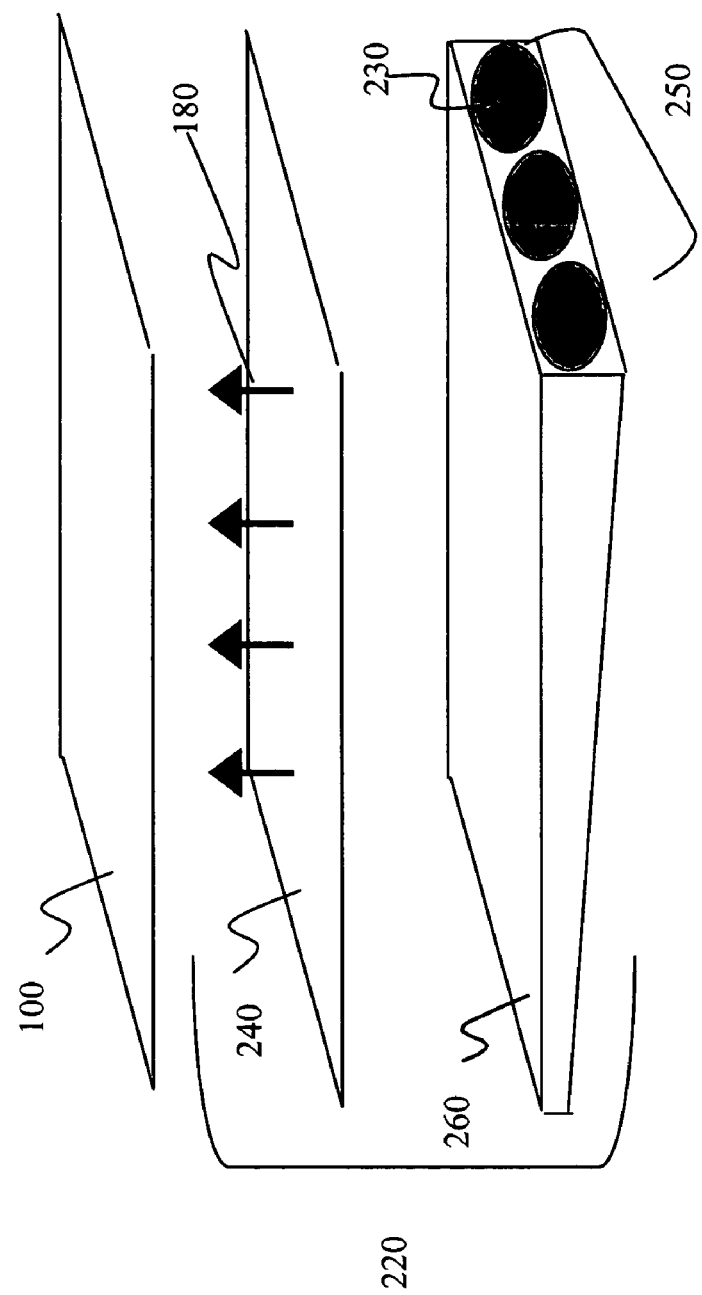
FIG. 5 is a simplified schematic of a linear LED-array driven backlight unit pumping the microcavity device array light source.
Figure 6:
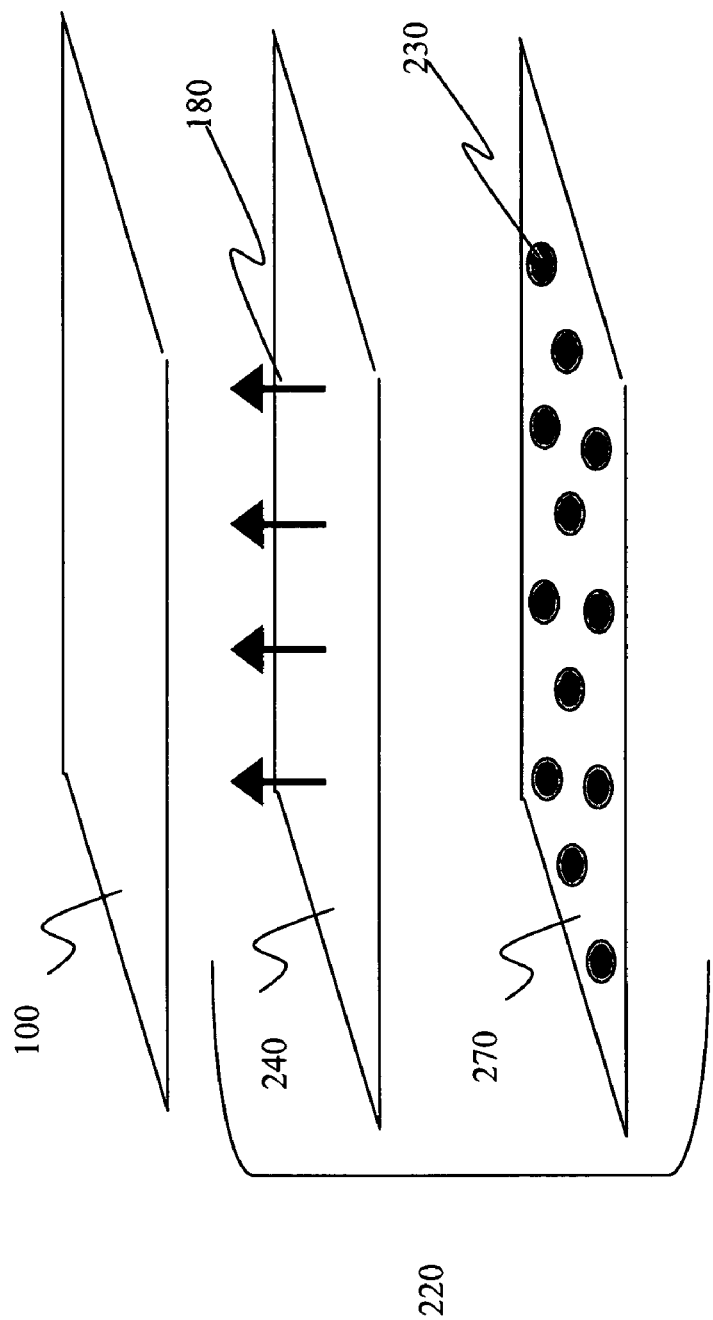
FIG. 6 is a simplified schematic of a planar LED-array driven backlight unit pumping the microcavity device array light source.
Figure 7:
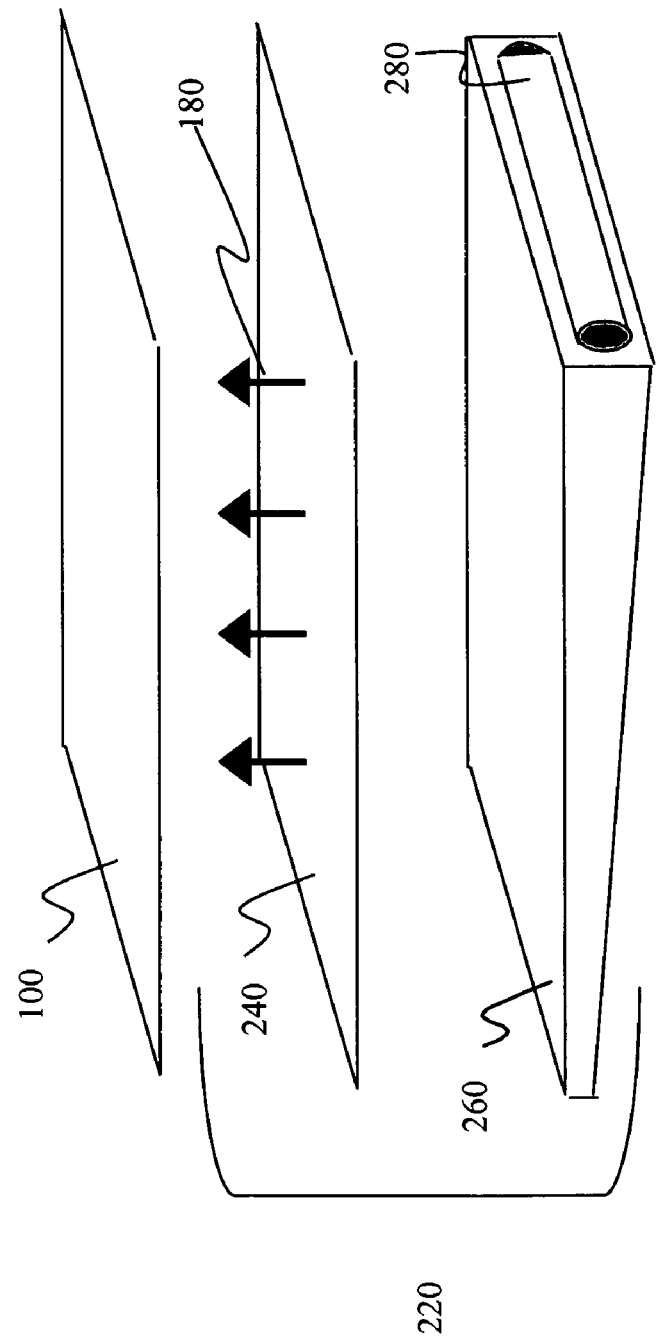
FIG. 7 is a simplified schematic of a cold cathode fluorescent lamp driven backlight unit pumping the microcavity device array light source.
Figure 8:
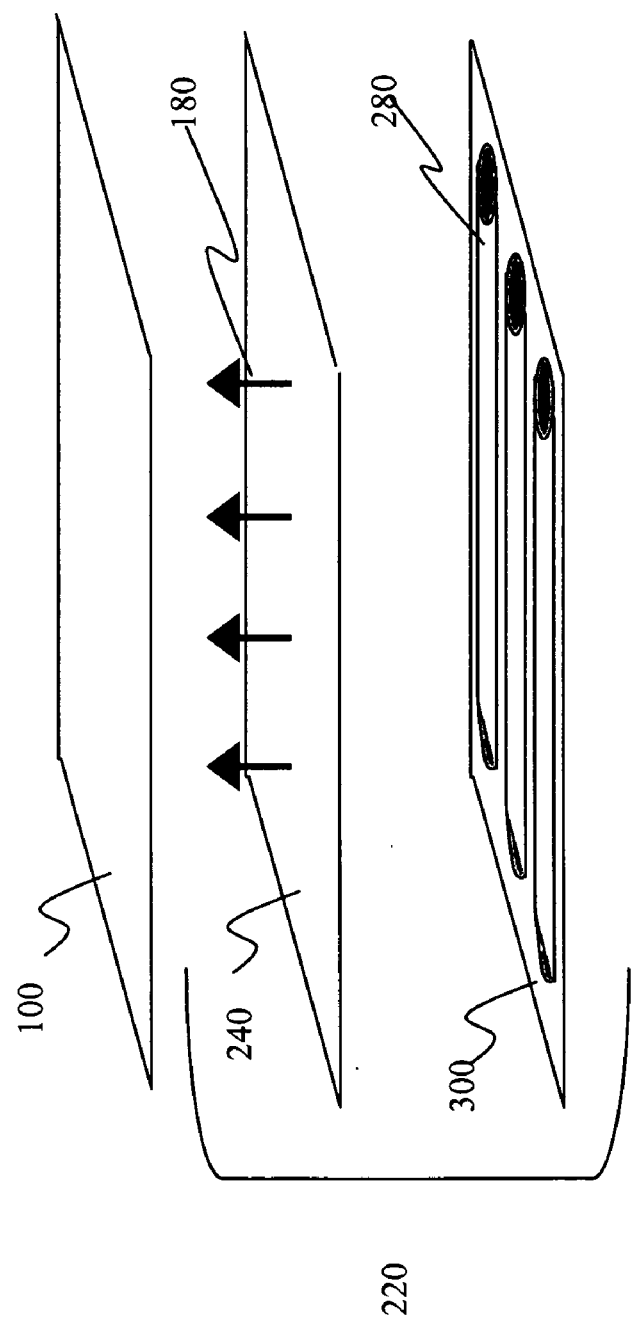
FIG. 8 is simplified schematic of another embodiment of a cold cathode fluorescent lamp driven backlight unit pumping the microcavity device array light source.

With the invention of a display containing the microcavity array device 100, a simplified liquid crystal display can be made. The more simplified LCD, as shown in FIG. 4, typically contains a backlight unit 220, the microcavity array device 100, a polarizer 305, a light shutter layer 310, and a beam expander 320. The backlight unit 220 provides the pump-beam light 180 for the microcavity array device 100. The microcavity array device 100, together with the polarizer 305, provides a colored, pixelated, polarized light source for the light shutter layer 310. The light shutter layer 310 either passes or blocks light in a pixelated structure. The beam expander 320 takes the light exiting the light shutter layer 310 and expands its viewing cone.

The backlight unit 220, as shown in FIGS. 5-8 for producing the pump-beam light 180, is comprised of a diffuser 240 and either light emitting diodes (LEDs) 230 or a cold cathode fluorescent lamp (CCFL) 280. The diffuser 240 homogenizes the light incident on the microcavity array device 100. The LEDs 230 are typically either in a linear array 250 illuminating the edge of a waveguide 260, which then redirects the light such that it is illuminating the microcavity array device 100, or in a planar array 270 directly illuminating the microcavity array device 100. The CCFL 280 is typically either illuminating the edge of the waveguide 260, which redirects the light such that it is illuminating the microcavity array device 100, or oriented in rows 300 underneath the diffuser and directly illuminating the microcavity array device 100.

The small divergence angle of the microcavity array device 100 enables a 1:1 correspondence between the microcavity array's emitting elements 205 and the light shutter layer's 310 color elements. Correspondingly, it is no longer necessary to include a color filter array as one of the components of the light shutter layer 310. The light shutter layer 310 only needs to modulate the colored light incident from the microcavity array device 100; thus, limiting the efficiency loss associated with color filter arrays. An additional feature of the near collimation of the light output from the microcavity array device 100 is that the viewing angle compensation films can be removed from the display structure. Also due to the natural collimation (<10-15° divergence angle) of the microcavity array device 100 light output, is that the collimating films, which are typically included in the backlight unit 220, can be removed. As a result of eliminating viewing angle compensation films and the collimating films from the display structure, the cost of the liquid crystal display device can be reduced. However, to prevent light leakage from neighboring pixels, the small divergence of the microcavity array device 100 light output must be accounted for. To prevent light of the incorrect color from escaping through a neighboring pixel, the size of the microcavity array's emitting elements 205 must be slightly reduced in order that the microcavity light upon traversing into the light shutter layer 310 will subtend the proper pixel dimension of approximately 80×240 µm. The size of the emitting elements can be adjusted by selectively depositing metal between the bottom dielectric stack 120 and the substrate 110. Preferred metals are Al or Ag, which can be selectively deposited by well known evaporation techniques. These metals are highly reflective of the pump-beam light 180 and will cause the recycling of the pump-beam light 180 until it passes between the metal depositions.

Figure 9:
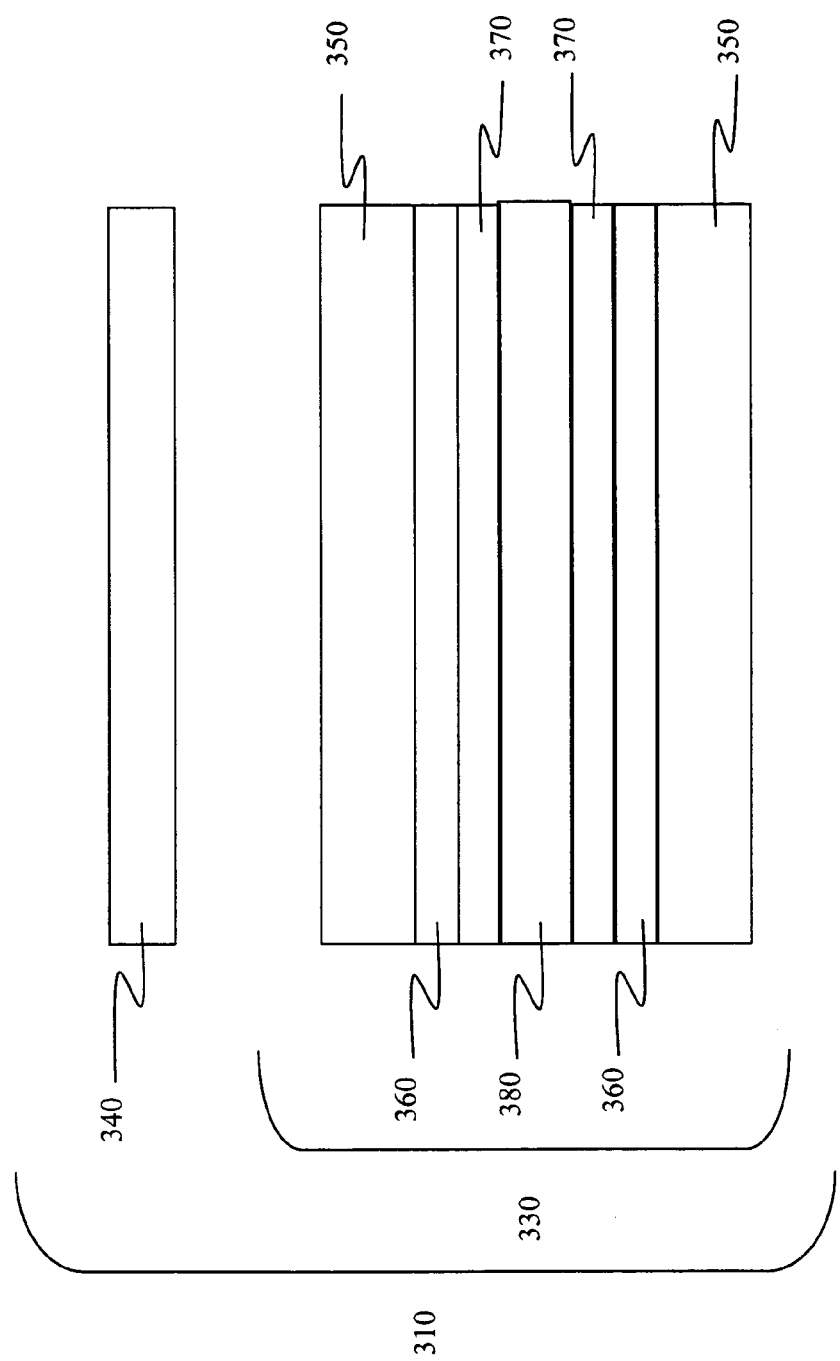
FIG. 9 is a simplified schematic of the liquid crystal cell and its components, including the analyzer.

The light shutter layer 310, as shown in FIG. 9, is typically a liquid crystal cell 330 with an analyzer 340 on the side farthest from the microcavity array device 100. The liquid crystal cell 330 is analogous to conventional liquid crystal cells except that it does not contain a CFA. The liquid crystal cell 330 does not require a CFA since the light output from the microcavity array device 100 is pixelated into red, green, and blue microcavity emission. The liquid crystal cell 330 comprises liquid crystal substrates 350 on the top and bottom. The liquid crystal substrates 350 in the liquid crystal cell 330 can include either glass plates or plastic substrates. The thickness of the liquid crystal substrates 350 should be sufficiently thin to prevent parallax, which would result in light leakage through adjacent pixels. The thickness of the liquid crystal substrates 350 should preferably be less then 0.5 mm. Both of the liquid crystal substrates 350 are coated with a patterned transparent conductor layer 360. Typical transparent conductors are indium tin oxide. On top of each of the transparent conductor layers 360 is coated an alignment layer 370. Lastly, between the two alignment layers 370 is coated the liquid crystal material 380. The liquid crystal cell 330 modulates the light intensity output from the microcavity array device 100 by orienting the liquid crystal molecules upon selective application of voltages. The liquid crystal cell 330 can also contain thin film transistors at each pixel location, permitting the display to be driven actively. However, the invention does not require a specific drive scheme. The light shutter layer 310 also contains the analyzer 340 that resolves the polarized light output from the liquid crystal cell 330.

Those skilled in the art will appreciate that other light shutters can be used with the present invention. An example is a light shutter produced by electrowetting. In this light switch, as demonstrated by Hayes, et al., Nature, 425, 383 (2003), the application of an electric field changes the degree to which dye-containing oil droplets cover the surface of each pixel. In effect, the electric field modifies the hydrophobicity of the pixel surface. Hayes, et al., Nature, 425, 383 (2003) envisioned their switch used for a reflective display, where the reflection is produced by a white reflector in back of the oil droplets. The electrowetting switch could also be used in transmission if the backplane is clear instead of reflective.

Since the light output of the microcavity array device 100 is nearly collimated, it is necessary to include a beam expander 320 as the final element of the LCD device of FIG. 4 in order to increase the angular cone of the colored light output. Possible components comprising the beam expander 320 can be a diffuser element or a microlens array. The component should be such that it increases the viewing cone while preserving the sharpness of the display image. More specifically, upon exiting the beam expander 320, each pixel should be as clearly distinguishable as prior to entering the beam expander 320. Depending on the intended viewing application, the expansion of the viewing cone by the beam expander 320 can be adjusted accordingly.

Figure 10:
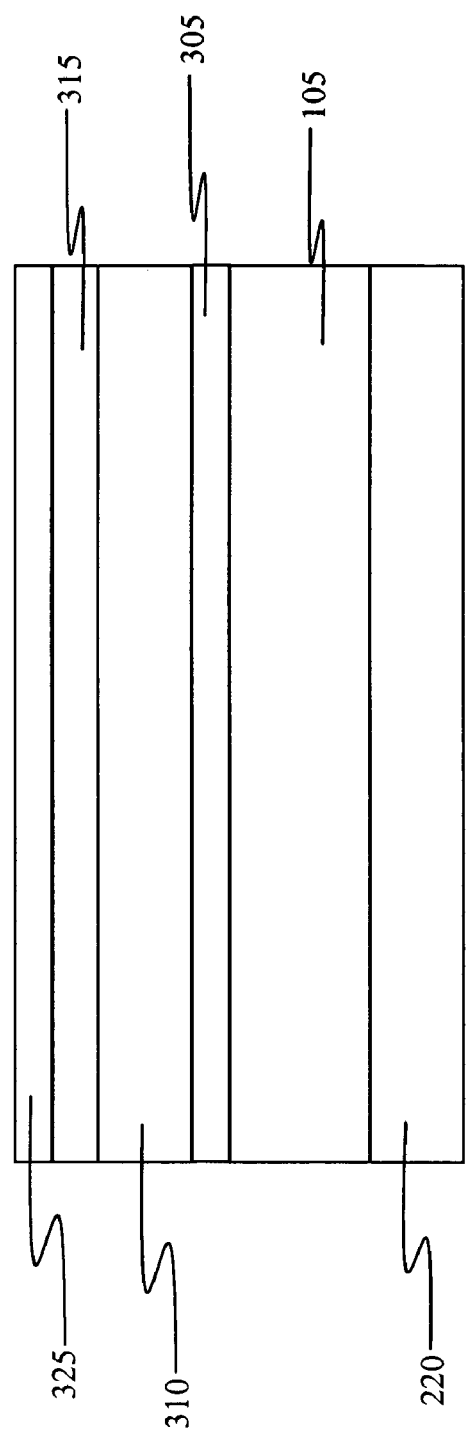
FIG. 10 is a simplified schematic of another embodiment of a display device containing the microcavity device array light source.

Another embodiment of the liquid crystal display device, as shown in FIG. 10, contains a backlight unit 220, a blue-emitting microcavity array device 105, a polarizer 305, a light shutter layer 310, a red/green dielectric stack 315, and a color conversion layer 325. The backlight unit 220 provides the pump-beam light 180 for the blue-emitting microcavity array device 105. The blue-emitting microcavity array device 105 along with the polarizer provides a blue polarized light source for the light shutter layer 310. With regard to the blue-emitting microcavity array device 105, its composition and operation is analogous to that discussed above, except that it only outputs blue microcavity light. The light shutter layer 310 either passes or blocks blue light in a pixelated structure. The color conversion layer 325 selectively absorbs the blue microcavity light and down converts it to red and green colored light at the positions of the red and green display pixels. The red/green dielectric stack 315 is placed between the color conversion layer 325 and the light shutter layer 310 in order that the red and green colored light only propagates in the direction of the viewer. At the positions of the blue display pixels, no down conversion occurs. As a result, at the position of the blue display pixels, the color conversion layer 325 contains forward scattering elements in order to increase the angular emission cone of the collimated blue microcavity light.

For the case of blue-only emission from the blue-emitting microcavity array device 105, the light shutter layer 310 can be slightly modified in order to optimize its operation. More specifically, the liquid crystal cell 330 modulates the blue light intensity output from the blue-emitting microcavity array device 105 by orienting the liquid crystal molecules upon selective application of voltages. The liquid crystal cell 330 should be tuned so that the dark state is optimized for the central wavelength of the incident blue microcavity light from the blue-emitting microcavity array device 105. In this way the contrast of the display device can be increased.

The color conversion layer 325 selectively absorbs the modulated blue microcavity light and down converts it to red and green colored light at the positions of the red and green display pixels. In order to down convert the blue light to red and green colored light, the layer can comprise red and green emitting organic fluorescent dyes in a solid matrix, respectively. Organic fluorescent dyes have the advantages of high fluorescent quantum efficiencies and high absorption cross-sections. In addition, they can be deposited by cost effective deposition techniques, such as spin coating. Candidate red and green high quantum efficiency organic dyes are [4-(dicyanomethylene)-2-t-butyl-6-(1,1,7,7-tetramethyl-julolidyl-9-enyl)-4H-pyran] (DCJTB) and [10-(2-benzothiazolyl)-2,3,6,7-tetrahydro-1,1,7,7-tetramethyl-1H,5H,11H-[1]Benzopyrano[6,7,8-ij]quinolizin-11-one] (Coumarin 545T), respectively. Both have fluorescent quantum efficiencies near 100% (in solid films) and large absorption cross-sections in the 460-480 nm wavelength range, where the blue-emitting microcavity array device 105 would be emitting. Besides using organic fluorescent dyes as the down converters, recent results point to the viability of using inorganic quantum dots as the fluorescent compounds in the color converter layer 325. For example, colloidal CdSe/CdS heterostructure quantum dots have demonstrated quantum yields above 80%, A. P. Alivisatos, MRS Bulletin 18 (1998). The solid matrix containing the organic or inorganic fluorescent material should be transparent to visible wavelength light and capable of being deposited by inexpensive processes. Preferred solid matrices are transparent plastics, such as poly-vinyl acetate or PMMA. In doping the matrices with the organic dyes, the dye concentration needs to be kept just below where concentration quenching begins to occur. As such, the doping concentration would be in the 0.5-2% range for DCJTB and Coumarin 545T.

Even though the internal quantum efficiencies are nearly 100% for select organic fluorescent dyes, the external quantum efficiencies can be limited as a result of light trapping in the solid matrix. A preferred way for increasing the external quantum efficiencies is to include scattering centers with the dye particles when depositing them along with the solid matrix material. The scattering particles should have diameters on the order of one-half of the emission wavelength (red and green), indices different from that of the solid matrix, and be transparent throughout the visible spectral range. A preferred particle would be $TiO_2$ as a result of its transparency throughout the visible spectrum and its large index of refraction.

Since the display light needs to be directed towards the viewer, the red/green dielectric stack 315 is placed between the color conversion layer 325 and the light shutter layer 310. The red/green dielectric stack 315 should reflect greater than 80% of the red and green emission and pass at least 90% of the blue microcavity light. It is preferred that the red/green dielectric stack 315 be deposited by an inexpensive methodology, such as polymeric extrusion, colloidal deposition, or plasma enhanced chemical vapor deposition. Other methodologies are possible as commonly practiced in the art.

As stated above, the color converter layer 325 contains blue pixels that pass the blue laser light without down conversion. Because of the narrow divergence angle of the blue microcavity light, the blue pixels need to incorporate materials that increase the angular emission cone of the blue light. As is well known in the art, scattering particles can be selected which preferentially scatter the blue microcavity light in the forward direction. As for the green and red pixels, the scattering particles should have indices different from that of the solid matrix and be transparent. Both the size and index of refraction of the scattering particles are chosen according to well-known formulations that enhance forward scattering. Besides increasing the angular emission cone by including scattering particles in the blue pixel matrix, other methodologies are possible as commonly practiced in the art.

The blue, green, and red pixels of the color converter layer 325 need to be sized according to the display application (given the display area and resolution) and be deposited selectively using a cost effective procedure. One methodology is to incorporate the fluorescent particles and the scattering particles in a photoresist formulation. This type of an approach has been used to make dyed photo-imageable photoresist (the CFA is commonly deposited by this technique), where dyed particles are added to the photoresist formulation. Using this approach, the blue, green, and red portions of the color converter layer 325 can be selectively deposited using photolithographic techniques that are well known in the art. Besides selective deposition by photolithographic methodologies of the color converter layer 325, other methodologies can be employed as commonly practiced in the art.

In addition to the efficiency gain obtained by removal of the CFA from the light shutter layer 310, having a large area, blue-emitting microcavity array device as the light source brings other advantages. Since the blue microcavity light emission is nearly collimated, both the viewing angle compensation films and the collimating films (typically found in the backlight unit 220) can be removed from the display structure. As a result of the eliminating the viewing angle compensation films and the collimating films from the display structure, the cost of the liquid crystal display device can be reduced.

The invention has been described in detail with particular reference to certain preferred embodiments thereof, but it will be understood that variations and modifications can be effected within the spirit and scope of the invention.

PARTS LIST 1 optic axis
3 x-y-z coordinate system
5 display surface
7 display normal direction
9 optic axis
100 microcavity array device
105 blue-emitting microcavity array device
110 substrate
120 bottom dielectric stack
130 active region
140 top dielectric stack
160 periodic gain region
170 spacer layers
180 pump-beam light
190 microcavity emission
205 emitting element
220 backlight unit
230 light emitting diodes
240 diffuser
250 linear array
260 waveguide
270 planar array
280 cold cathode fluorescent lamp
300 rows
305 polarizer
310 light shutter layer
315 red/green dielectric stack
320 beam expander
325 color conversion layer PARTS LIST (con't)

330 liquid crystal cell
340 analyzer
350 liquid crystal substrates
360 transparent conductor layer
370 alignment layer for liquid crystal molecules
380 liquid crystal material
φ azimuthal angle
θ tilt angle

The invention claimed is:

1. A display apparatus for producing colored pixelated light, comprising:
   a) a backlight unit for providing a pump-beam light;
   b) a microcavity light-producing array responsive to pump-beam light and having pixels wherein each pixel includes:
      i) a transparent substrate;
      ii) a bottom dielectric stack reflective to light over a predetermined range of wavelengths;
      iii) an active region responsive to pump-beam light for producing display light; and
      iv) a top dielectric stack spaced from the bottom dielectric stack and reflective to light over a predetermined range of wavelengths;
   c) a light shutter for permitting selected display light from the microcavity light-producing array to pass therethrough;
   d) a polarizing layer disposed between the microcavity light-producing array and the light shutter; and
   e) a beam expander disposed over the light shutter for increasing the angular cone of view of the display light.

2. The display apparatus of claim 1 wherein the active region of different pixels produces different colored display light in response to the pump-beam light.

3. The display apparatus of claim 1 wherein pump-beam light is transmitted and introduced into the active region through at least one of the dielectric stacks.

4. The display apparatus of claim 1 wherein the light shutter includes at least one layer having liquid crystals which are responsive to an applied field for permitting selected display light to pass through and means for applying the field to selected portions of the liquid crystal layer.

5. The display apparatus of claim 1 wherein the light shutter includes at least one layer of polarizing film.

6. The display apparatus of claim 1 wherein the light shutter includes at least one layer having electrowetting switches.

7. The display apparatus of claim 1 wherein the backlight unit includes light emitting diodes or cold cathode fluorescent lamps.

8. The display apparatus of claim 1 wherein the active region includes one or more periodic gain region(s) and spacer layers disposed on either side of the periodic gain region(s) and arranged so that the periodic gain region(s) is aligned with the antinodes of the device's standing wave electromagnetic field.

9. The display apparatus of claim 8 wherein the periodic gain region(s) of different pixels produce red, green, or blue light.

10. The display apparatus of claim 8 wherein the periodic gain region(s) includes an organic host material and a dopant.

11. The display apparatus of claim 8 wherein the spacer layers are substantially transparent to pump-beam light and the microcavity light.

12. The display apparatus of claim 11 wherein the spacer layers include 1,1-Bis-(4-bis(4-methyl-phenyl)-amino-phenyl)-cyclohexane or silicon dioxide.

13. The display apparatus of claim 10 wherein the portions of the periodic gain region(s) producing green light include the host material of aluminum tris(8-hydroxyquinoline) and the dopant of [10-(2-benzothiazolyl)-2,3,6,7-tetrahydro-1,1,7,7-tetramethyl-1H,5H,11H-[1]Benzopyrano[6,7,8-ij]quinolizin-11-one].

14. The display apparatus of claim 10 wherein the portions of the periodic gain region(s) producing red light includes the host material of aluminum tris(8-hydroxyquinoline) and the dopant of [4-(dicyanomethylene)-2-t-butyl-6-(1,1,7,7-tetramethyljulolidyl-9-enyl)-4H-pyran].

15. The display apparatus of claim 10 wherein the portions of the periodic gain region(s) producing blue light includes the host material of 2-tert-butyl-9,10-di-naphthalen-2-yl-anthracene and the dopant of 2,5,8,11-tetrakis(1,1-dimethylethyl)-perylene.

16. The display apparatus of claim 8 wherein the periodic gain region(s) includes polymeric materials.

17. The display apparatus of claim 8 wherein the periodic gain region(s) includes inorganic nanoparticles.

18. A display apparatus for producing colored pixelated light, comprising:
 a) a backlight unit for providing a pump-beam light;
 b) a microcavity light-producing array responsive to pump-beam light and having pixels wherein each pixel includes:
  i) a transparent substrate;
  ii) a bottom dielectric stack reflective to light over a predetermined range of wavelengths;
  iii) an active region responsive to pump-beam light for producing blue light; and
  iv) a top dielectric stack spaced from the bottom dielectric stack and reflective to light over a predetermined range of wavelengths;
 c) a light shutter for permitting selected colored light from the microcavity light-producing array to pass therethrough;
 d) a polarizing layer disposed between the microcavity light-producing array and the light shutter; and
 e) a color conversion layer including different portions where selected different portions in response to blue light produce a different colored light and being adapted to increase the angular cone of view of the selected colored light.

19. The display apparatus of claim 18 wherein the color conversion layer includes different color change materials to produce red and green colored display light.

20. The display apparatus of claim 18 further including a third dielectric stack disposed on top of the light shutter for reflecting red and green light from the color conversion layer.

21. The display apparatus of claim 18 wherein pump-beam light is transmitted and introduced into the active region through at least one of the dielectric stacks.

22. The display apparatus of claim 18 wherein the light shutter includes at least one layer having liquid crystals which are responsive to an applied field for permitting selected display light to pass through and means for applying the field to selected portions of the liquid crystal layer.

23. The display apparatus of claim 18 wherein the light shutter includes at least one layer of polarizing film.

24. The display apparatus of claim 18 wherein the light shutter includes at least one layer having electrowetting switches.

25. The display apparatus of claim 18 wherein the backlight unit includes light emitting diodes or cold cathode fluorescent lamps.

26. The display apparatus of claim 18 wherein the active region includes one or more periodic gain region(s) and spacer layers disposed on either side of the periodic gain region(s) and arranged so that the periodic gain region(s) is aligned with the antinodes of the device's standing wave electromagnetic field.

27. The display apparatus of claim 26 wherein the periodic gain region(s) includes an organic host material and a dopant.

28. The display apparatus of claim 26 wherein the spacer layers are substantially transparent to pump-beam light and the microcavity light.

29. The display apparatus of claim 28 wherein the spacer layers include 1,1-Bis-(4-bis(4-methyl-phenyl)-amino-phenyl)-cyclohexane or silicon dioxide.

30. The display apparatus of claim 27 wherein the portions of the periodic gain region(s) producing blue light includes the host material of 2-tert-butyl-9,10-di-naphthalen-2-yl-anthracene and the dopant of 2,5,8,11-tetrakis(1,1-dimethylethyl)-perylene.

31. The display apparatus of claim 26 wherein the periodic gain region(s) includes polymeric materials.

32. The display apparatus of claim 26 wherein the periodic gain region(s) includes inorganic nanoparticles.

* * * * *